United States Patent
Chen et al.

(10) Patent No.: US 10,454,987 B2
(45) Date of Patent: Oct. 22, 2019

(54) BITRATE OPTIMIZATION FOR MULTI-REPRESENTATION ENCODING USING PLAYBACK STATISTICS

(71) Applicant: Google Inc., Mountain View, CA (US)

(72) Inventors: Chao Chen, Fremont, CA (US); Yao-Chung Lin, Sunnyvale, CA (US); Anil Kokaram, Sunnyvale, CA (US); Steve Benting, San Mateo, CA (US)

(73) Assignee: Google LLC, Mountain View, CA (US)

( * ) Notice: Subject to any disclaimer, the term of this patent is extended or adjusted under 35 U.S.C. 154(b) by 125 days.

(21) Appl. No.: 15/337,806

(22) Filed: Oct. 28, 2016

(65) Prior Publication Data

US 2018/0124146 A1    May 3, 2018

(51) Int. Cl.
*H04L 29/06* (2006.01)
*H04L 12/811* (2013.01)
(Continued)

(52) U.S. Cl.
CPC ............ *H04L 65/607* (2013.01); *H04L 47/38* (2013.01); *H04L 65/4069* (2013.01);
(Continued)

(58) Field of Classification Search
CPC ......... H04N 21/2343; H04N 21/23439; H04N 21/2402; H04N 21/26258; H04N 21/64769; H04N 21/845
(Continued)

(56) References Cited

U.S. PATENT DOCUMENTS

2011/0249954 A1* 10/2011 Meek ..................... H04N 5/772
                                                                386/239
2011/0262102 A1* 10/2011 Lahr ...................... H04N 5/765
                                                                386/239

(Continued)

FOREIGN PATENT DOCUMENTS

CA    2975904 A1    8/2016

OTHER PUBLICATIONS

PCT Notification of Transmittal of the International Search Report and the Written Opinion of the International Searching Authority for PCT Application No. PCT/US2017/053318, dated Jan. 3, 2018, 15 pages.

(Continued)

*Primary Examiner* — June Y Sison
*Assistant Examiner* — Adam A Cooney
(74) *Attorney, Agent, or Firm* — Lowenstein Sandler LLP (57) ABSTRACT

Implementations disclose bitrate optimization for multi-representation encoding using playback statistics. A method includes generating multiple versions of a segment of a source video, the versions comprising encodings of the segment at different encoding bitrates for each resolution of the segment, measuring a quality metric for each version of the segment, generating rate-quality models for each resolution of the segment based on the measured quality metrics corresponding to the resolutions, generating a probability model to predict requesting probabilities that representations of the segment are requested, the probability model based on a joint probability distribution of network speed and viewport size that is generated from client-side feedback statistics associated with prior playbacks of other videos, determining an encoding bitrate for each of the representations of the segment based on the rate-quality models and the probability model, and assigning determined encoding bitrates to corresponding representations of the segment.

22 Claims, 6 Drawing Sheets

(51) Int. Cl.
*H04N 21/2343* (2011.01)
*H04N 21/258* (2011.01)

(52) U.S. Cl.
CPC ..... *H04N 21/23439* (2013.01); *H04N 21/258* (2013.01); *H04L 65/80* (2013.01)

(58) Field of Classification Search
USPC ........................................................ 709/219
See application file for complete search history.

(56) References Cited

U.S. PATENT DOCUMENTS

| | | | |
|---|---|---|---|
| 2013/0007263 A1 | 1/2013 | Soroushian et al. | |
| 2013/0223509 A1 | 8/2013 | Tweedale et al. | |
| 2014/0215541 A1* | 7/2014 | Horen | H04N 21/2181 725/109 |
| 2015/0032854 A1 | 1/2015 | Wang et al. | |
| 2015/0089555 A1* | 3/2015 | Abkairov | H04L 65/60 725/93 |
| 2015/0089557 A1* | 3/2015 | Busse | H04N 21/23439 725/95 |
| 2015/0142567 A1* | 5/2015 | Neelakant | G06Q 30/0256 705/14.54 |
| 2015/0341411 A1* | 11/2015 | Huber | H04L 65/4092 709/231 |
| 2016/0073106 A1 | 3/2016 | Su et al. | |
| 2016/0198165 A1 | 7/2016 | Zhou et al. | |
| 2017/0347026 A1* | 11/2017 | Hannuksela | H04N 5/23238 |
| 2018/0041788 A1* | 2/2018 | Wang | H04N 21/2402 |

OTHER PUBLICATIONS

Silbey, Mari, "Netflix Isn't the Only One Rethinking ABR", Light Reading, http://www.lightreading.com/video/video-storage-delivery/nettlix-isnt-the-only-one-rethinking-abr/d/d-id/719883, Dec. 15, 2015, 6 pages.

"Netflix", The Netflix Tech Blog: Per-Title Encode Optimization, http://techblog.netflix.com/2015/12/per-title-encode-optimization.html, Dec. 14, 2015, 15 pages.

Ulm, John et al., "ARRIS", Smart ABR: The Future of Managed IP Video Services, https://www.arris.com/globalassets/resources/white-papers/ncta13-smart_abr_future_mnged_video_services.pdf, 2013, 38 pages.

Chari, Santhana, "ABR Delivery Architectures and Virtualization", https://www.arris.com/globalassets/resources/white-papers/arris_abr_delivery_architectures_wp.pdf, 2014, 18 pages.

* cited by examiner

BITRATE OPTIMIZATION FOR MULTI-REPRESENTATION ENCODING USING PLAYBACK STATISTICS

TECHNICAL FIELD

This disclosure relates to the field of video streaming and, in particular, to bitrate optimization for multi-representation encoding using playback statistics.

BACKGROUND

The streaming of multimedia (e.g., videos) to a client device over a network may be based on adaptive bitrate streaming. For example, bandwidth and processing capability of the client device may be detected in real time. In response to a change of the detected bandwidth and viewport size, the video stream accessed by the client device may be adjusted accordingly. As an example, a video may be encoded at different bitrates. The client device may switch from a first representation of the video to a second representation of the video in response to the changing resources or capabilities of the client device.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes generating multiple versions of a segment of a source video, the versions comprising encodings of the segment at different encoding bitrates for each resolution of the segment, measuring a quality metric for each version of the segment, generating rate-quality models for each resolution of the segment based on the measured quality metrics corresponding to the resolutions, generating a probability model to predict requesting probabilities that representations of the segment are requested, the probability model based on a joint probability distribution of network speed and viewport size that is generated from client-side feedback statistics associated with prior playbacks of other videos, determining an encoding bitrate for each of the representations of the segment based on the rate-quality models and the probability model, and assigning determined encoding bitrates to corresponding representations of the segment.

In one implementation, the segment may include the entire source video. In addition, the requesting probability for one of the representations is further based on the encoding bitrate of the representation and a relation of the encoding bitrate to network speed in the joint probability distribution, and the resolution of the representation and a relation of the resolution to viewport size in the joint probability distribution.

In some implementations, the client-side feedback statistics include playback traces transmitted from media players at client devices, the playback traces comprising network speed measurements and viewport sizes, wherein the joint probability distribution is generated from cumulative measurements of the network speeds determined from the playback traces and from cumulative measurements of the viewport sizes determined from the playback traces. Furthermore, the playback traces may be collected from a geographic region of the source video, and wherein the joint probability distribution is specific to the geographic region of the source video. Additionally, the playback traces may be collected for a type of the source video, and wherein the joint probability distribution is specific to the type of the source video.

In one implementation, determining the encoding bitrate for each of the representations further comprises minimizing an average egress traffic for the segment such that an average quality of the segment is maintained at or above a defined quality level, wherein the average egress traffic is a function of the different encoding bitrates and the requesting probabilities, and wherein the average quality is a function of the quality metrics and the requesting probabilities. In some implementations, determining the encoding bitrate for each of the representations further comprises maximizing an average quality for the segment such that an average egress traffic of the segment is maintained at or below a defined video egress traffic level, wherein the average quality is a function of the quality metrics and the requesting probabilities, and wherein the average egress traffic is a function of the multiple bitrates and the requesting probabilities.

Furthermore, assigning the determined encoding bitrates to the corresponding representations may further include providing the selected encoding bitrates to at least one transcoder for encoding of each of the representations of the segment at the corresponding bitrate. In addition, the representation may include a bitrate/resolution combination of the segment, and wherein the segment may include one or more representations for each of the resolutions of the segment. In some implementations, the quality metric may include a Peak Signal-to-Noise Ratio (PSNR) measurement or a Structural Similarity (SSIM) measurement.

Computing devices for performing the operations of the above described method and the various implementations described herein are disclosed. Computer-readable media that store instructions for performing operations associated with the above described method and the various implementations described herein are also disclosed.

BRIEF DESCRIPTION OF THE DRAWINGS

The disclosure is illustrated by way of example, and not by way of limitation, in the figures of the accompanying drawings.

DETAILED DESCRIPTION

Aspects and implementations of the disclosure are described for bitrate optimization for multi-representation encoding using playback statistics. Adaptive bitrate streaming may be used to stream multimedia (e.g., a video) from a server (e.g., an adaptive video streaming system) to a client system (e.g., a media player on a client device) over a network. The adaptive video streaming system encodes a source video into several representations of different encoding bitrates, resolutions, and frame rates. A representation may refer to a result of encoding a video and/or a video segment at one resolution using one bitrate. This set of encoded representations allows the client systems to adaptively-select appropriate encoded representations according to the network bandwidth and viewport size during the video streaming. For example, a media player of a client device may switch from a first representation or encoding of a video to a second representation or encoding of the video of a different quality in response to changing conditions (e.g., CPU, network bandwidth, viewport size, etc.) associated with the client device.

To support the switching between quality levels or formats of a video may result in a video (or individual segments of the video) may be transcoded into multiple resolutions (e.g., 1080p, 720p, 480p, 360p, etc.) by the adaptive video streaming system. Furthermore, each resolution of the video may be encoded at one or more encoding bitrates. (an encoding bitrate may also be referred to herein as a "bitrate"). Multi-representation encoding may refer to having one or more encoding bitrate representations for each resolution. A bitrate may refer to an amount of information or data stored per unit of playback time of the video. For example, a bitrate in video streaming may vary between 400 kbits/s and 40 MBits/s. In some cases, a higher bitrate correlates to better clarity and/or higher quality of the video to a viewer.

Conventional systems for adaptive bitrate streaming may utilize generic encoding configurations (e.g., an encoding bitrate to use for each representation) for encoding a video or video segment (also referred to as a "portion," "chunk," or "clip" of the video). The generic encoding configurations may refer to a pre-defined bitrate selected for each representation of the video or video segment that is to be encoded. In the conventional systems, the generic encoding configurations are selected to be "good on average" (e.g., satisfies a determined video quality measurement based on aggregated quality measurements at multiple client devices) for videos or video segments of a particular resolution.

However, each video and/or video segment is different, and the encoding configurations for the encoder should be chosen such that the encoded versions created for each video segment are appropriate for the specific video segment. The selection of encoding configurations (e.g., resolutions, bitrates, etc.) has an impact on the delivered video quality and the cost for storage and transmission. For example, the selection of a higher encoding bitrate for a resolution may result in better video quality, but it may also increase the cost for the adaptive video streaming system because the system is incurring costs associated with performance and resources for delivering video traffic to client systems and for storing the data (i.e., the higher the bitrate, the more data to transfer and store, and the higher the monetary cost to the system). Furthermore, as the encoding bitrate is increased, the quality of the video delivered to user devices may deteriorate. This is because network capacity may be limited. If the encoding bitrate is higher than the network throughput of a user device, the video cannot be delivered to the user device without re-buffering, which negatively affects the user experience. In addition, different videos have different characteristics and a general and/or generic encoding setting is unlikely to be universally-optimal for all videos.

Implementations of the disclosure analyze the trade-offs between the cost (e.g., transmission and storage costs) and delivered video quality for an encoding configuration based on information about playback statistics received from client systems. The playback statistics may refer to client-measured bandwidth (also referred to as network speed) and client viewport size. These playback statistics are used to determine an optimal set of encoding configurations (e.g., bitrate defined for each representation to be encoded) for each video and/or video segment. This optimal set of encoding configurations is used to minimize egress traffic from the adaptive video streaming system to client systems, while maintaining delivered quality of the video and/or video segment (as compared to conventional systems). "Egress traffic" or "egress" may refer to the rate that data is transmitted from a data source and/or a network (amount of data per unit of time).

Conventional systems did not consider client-side feedback in order to determine optimal encoding bitrates for specific videos and/or video segments. Implementations of the disclosure provide a technical improvement for adaptive video streaming systems by improving the efficiency of the encoding process (via optimized encoding configuration selection), thus reducing size and/or number of transmissions (improves utility of transmission bandwidth) as well as storage used for adaptive bitrate streaming, while maintaining video quality for client systems.

The disclosure often references videos for simplicity and brevity. However, the teachings of the disclosure are applied to media items generally and can be applied to various types of content or media items, including for example, video, audio, text, images, etc.

Figure 1:
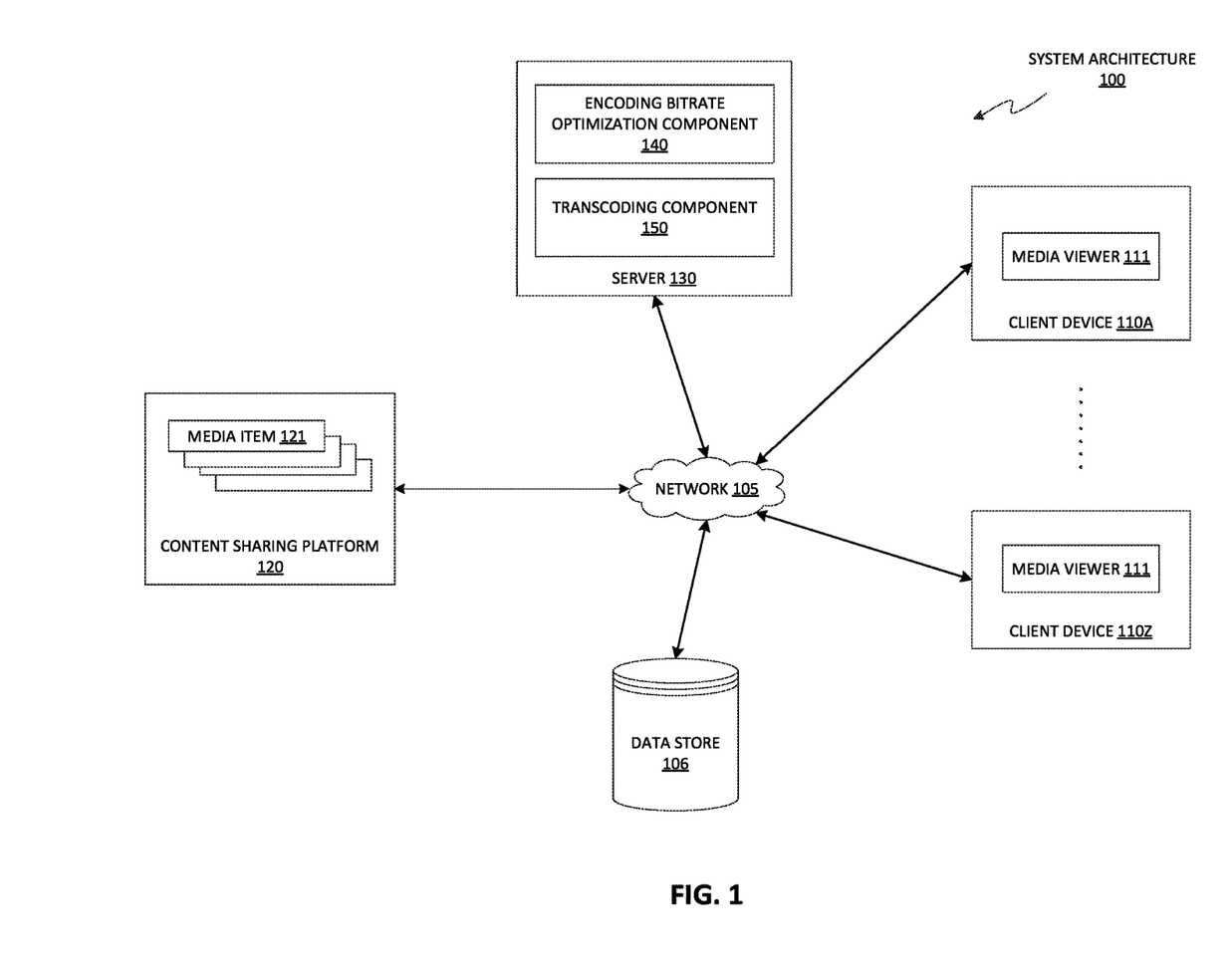
FIG. 1 is a block diagram illustrating an exemplary network architecture in which implementations of the disclosure may be implemented.

FIG. 1 illustrates an example system architecture 100, in accordance with one implementation of the disclosure. The system architecture 100 includes client devices 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, netbook computers, network-connected televisions, etc. In some implementations, client device 110A through 110Z may also be referred to as "user devices." Each client device includes a media viewer 111. In one implementation, the media viewers 111 may be applications that allow users to view content, such as images, videos, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application (e.g., a mobile application or app) that allows users to view digital media items (e.g., digital videos, digital images, electronic books, etc.). According to aspects of the disclosure, the media viewer 111 may be a content sharing platform application with bitrate optimization for multi-representation encoding using playback statistics.

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130, and/or downloaded from a separate server (not shown).

It should be noted that functions described in one implementation as being performed by the content sharing platform 120 can also be performed on the client devices 110A through 110Z in other implementations, if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), dislike, and/or comment on media items. The content sharing platform 120 may also include a website (e.g., a webpage) or application back-end software that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

The content sharing platform 120 may host data content, such as media items 121. The data content can be digital content chosen by a user, digital content made available by a user, digital content uploaded by a user, digital content chosen by a content provider, digital content chosen by a broadcaster, etc. Examples of a media item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, etc. In some implementations, media item 121 is also referred to as a content item.

A media item 121 may be consumed via the Internet and/or via a mobile device application. For brevity and simplicity, an online video (also hereinafter referred to as a video) is used as an example of a media item 121 throughout this document. As used herein, "media," media item," "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 106.

In one implementation, the server 130 may be one or more computing devices (e.g., a rackmount server, a server computer, etc.). In one implementation, the server 130 may be included in the content sharing platform 120. As an example, users of the client devices 110A-110Z may each transmit a request to the server 130 over the network 105 for one or more videos stored at the data store 106. In some implementations, the videos may be stored at the data store 106 in segments based on a resolution for each video and determined optimal bitrate for each resolution of each video, as discussed in further detail below. For example, each segment of a video may be decoded separately for video playback. Furthermore, the videos that have been divided into segments may be associated with the same segment boundaries (e.g., time boundaries) to enable switching between different bitrates and/or resolutions at the segment boundaries.

Thus, the data store 106 may store multiple videos where each video is divided into multiple segments. In some implementations, the data store 106 may further include a manifest file that may be transmitted by the server 130 to the client devices 110A-110Z. In some implementations, the manifest file may identify the available representations of the video (e.g., the available resolutions at available bitrates) and the segment boundaries for each segment of the video. The manifest file may be transmitted by the server 130 in response to a request for the streaming of a video in the data store 106 by the client devices 110A-110Z. Each of the client devices 110A-110Z may use the manifest file to switch between encoded versions of a stream from the server 130 based on the available resources (e.g., CPU and bandwidth) of the respective client device 110A-110Z. For example, a first encoded version of the stream of a video may be transmitted from the server 130 to the client device 110A based on the viewport size of the client device 110A and the network bandwidth associated with the client device 110A. Furthermore, a second encoded version of the stream of the same video may be transmitted from the server 130 to a different client device 110Z based on the viewport size of the client device 110Z and the network bandwidth associated with the client device 110Z.

In implementations of the disclosure, the server 130 may include an encoding bitrate optimization component 140. The encoding bitrate optimization component 140 determines a set of encoding bitrates (i.e., one or more bitrates for each resolution) for a source video. In some implementations, the encoding bitrate optimization component 140 may determine the set of encoding bitrates for each segment of the video. In one implementation, each bitrate in the determined set of encoding bitrates corresponds to a different resolution of the segment. In some implementations, there may be multiple bitrates associated with a resolution (e.g., 3 versions of 720p each at different bitrates). The video may then be stored at the data store 106 in segments based on a representation for each video segment and the optimal encoding bitrate(s) determined for the representation of the video segment. In some implementations, optimal encoding bitrates may be determined for the entire video in addition to, and/or in lieu of, segments of the video.

In some implementations, the encoding bitrate optimization component 140 determines the set of encoding bitrates for a video based on playback statistics (e.g., media player feedback) and rate-quality characteristics of the video. The playback statistics may refer to client-measured bandwidth and client viewport size. Bandwidth may refer to the average rate of successful data transfer through a communication path, and may be measured in bits per second. A bit stream's bandwidth is proportional to the average consumed signal bandwidth in Hertz (the average spectral bandwidth of the analog signal representing the bit stream) during a studied time interval. Viewport size may refer to an area (typically rectangular) expressed in rendering-device-specific coordinates, e.g. pixels for screen coordinates, in which the objects of interest are going to be rendered.

Implementations of the disclosure generate a rate-quality model for the video segment to be encoded based on quality characteristics of the video. This generated rate-quality model is used, along with the feedback statistics, to predict the egress and delivered quality of the video to client systems 110A-110Z. Based on these predictions, a non-linear optimization process may be applied to determine the optimized encoding bitrates for different representations of the source video.

The optimized encoding bitrates may then be used by a transcoding component 150 to encode a video and/or video segment(s) at the specific bitrate for each representation of the video and/or video segment(s). The transcoding component 150 may be located in the same computing device (e.g., server 130) as encoding bitrate optimization component 140, or may be located remote to encoding bitrate optimization component 140 and/or server 130. Transcoding component 150 includes components (e.g., hardware and/or instructions executable by a processing device) that convert media files from a source format into versions that can be played on a client device, such as a desktop computer, a mobile device, a tablet, and so on. Transcoding component 150 may be a single master transcoder component 150 or may be multiple different transcoding components dispersed locally and/or remote to server 130. Transcoding component 150 may utilize the optimized encoding bitrates as input to guide the transcoding operations performed for a video and/or video segment(s), and to generate a final stream for the video and/or video segment(s) that can be delivered to a media player (e.g., media viewer 111) at a client device 110A-110Z via an adaptive bitrate streaming process. The optimized encoding bitrates determined by implementations of the disclosure minimize egress traffic from the server 130 to client systems 110A-110Z, without compromising delivered quality of the video.

In some implementations, encoding bitrate optimization component 140 of server 130 may interact with content sharing platform 120 to provide multi-representation encoding bitrate optimization based on playback statistics. Further description of the encoding bitrate optimization component 140, as well as its specific functions, is described in more detail below with respect to FIG. 2.

Although implementations of the disclosure are discussed in terms of content sharing platforms and promoting social network sharing of a content item on the content sharing platform, implementations may also be generally applied to any type of social network providing connections between users. Implementations of the disclosure are not limited to content sharing platforms that provide channel subscriptions to users.

In situations in which the systems discussed here collect personal information about users (e.g., collection of feedback statistics from media viewers 111, collection of feedback data, etc.) or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
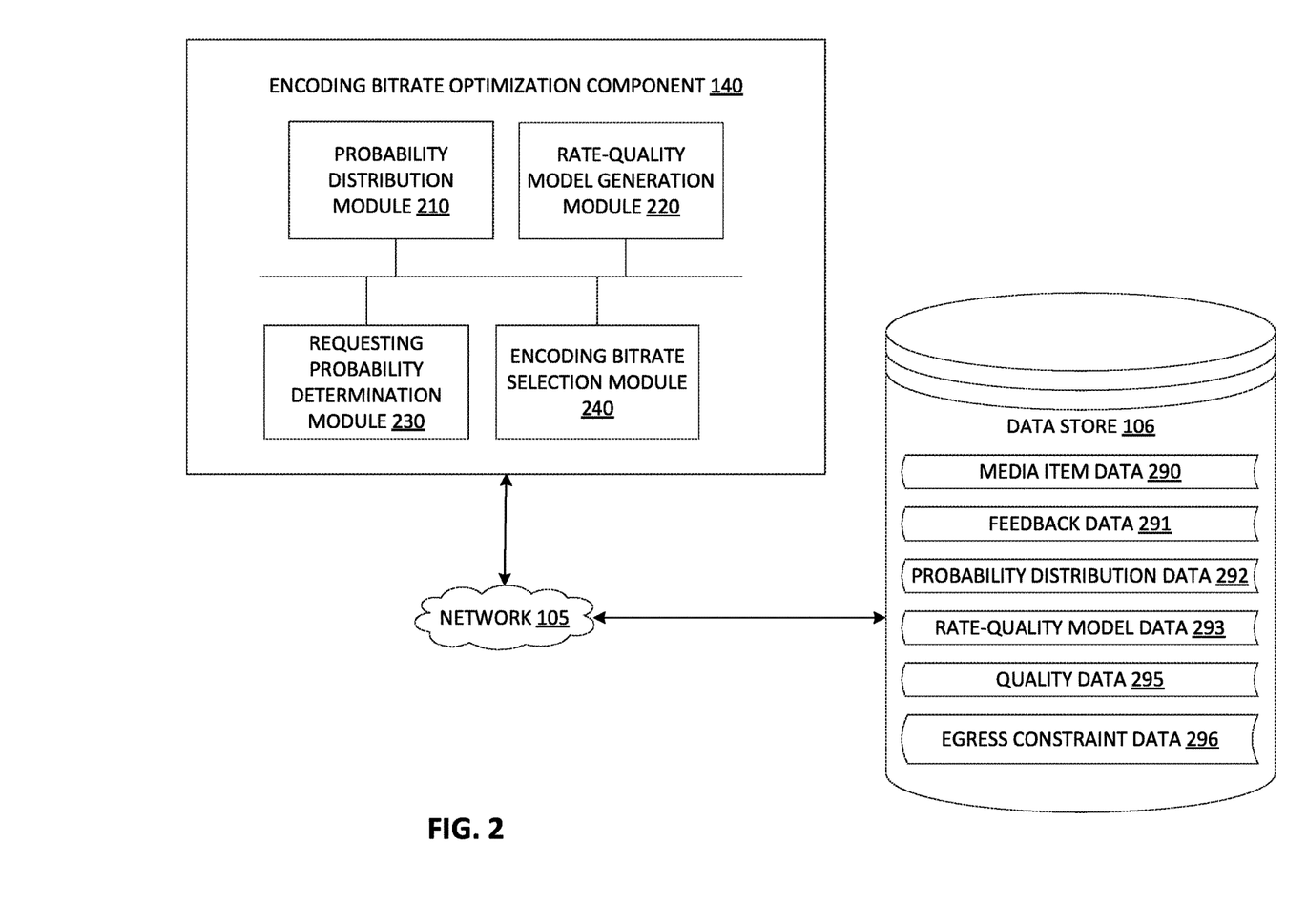
FIG. 2 is a block diagram of an encoding bitrate optimization component, in accordance with an implementation of the disclosure.

FIG. 2 is a block diagram illustrating encoding bitrate optimization component 140 in accordance with one implementation of the disclosure. As discussed above, the encoding bitrate optimization component 140 may interact with a single social network, or may be utilized among multiple social networks (e.g., provided as a service of a content sharing platform that is utilized by other third party social networks). In one implementation, the encoding bitrate optimization component 140 includes a probability distribution module 210, a rate-quality model generation module 220, a requesting probability determination module 230, and an encoding bitrate selection module 240. More or less components may be included in the encoding bitrate optimization component 140 without loss of generality. For example, two of the modules may be combined into a single module, or one of the modules may be divided into two or more modules. In one implementation, one or more of the modules may reside on different computing devices (e.g., different server computers, on a single client device, or distributed among multiple client devices, etc.). Furthermore, one or more of the modules may reside on different content sharing platforms, third party social networks, and/or external servers.

The encoding bitrate optimization component 140 is communicatively coupled to the data store 106. For example, the encoding bitrate optimization component 140 may be coupled to the data store 106 via a network (e.g., via network 105 as illustrated in FIG. 1). The data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 includes media item data 290, feedback data 291, probability distribution data 292, rate quality model data 293, quality data 295, and egress constraint data 296.

As discussed above, the encoding bitrate optimization component 140 determines and/or calculates a set of optimal encoding bitrates (i.e., one or more bitrates for each representation) for a video and/or segments of a video. In one implementation, each bitrate in the determined set of encoding bitrates corresponds to a different representation of the video or video segment. In some implementations, there may be multiple bitrates associated with a resolution. The video may then be stored at the data store 106 in segments based on a representation for each video segment, at the optimal one or more bitrate(s) determined for the representation of the video segment. For ease of the following discussion, the encoding bitrate optimization component 140 is described as determining the set of optimal encoding bitrates for a segment of a video.

Initially, to determine the set of encoding bitrates, the encoding bitrate optimization component 140 initiates the probability distribution module 210 to generate probability distributions based on feedback statistics (also referred to herein as client-side feedback statistics) from media players. A probability distribution may refer to is an equation or function that links each outcome of a statistical experiment with its probability of occurrence. For example, the probability distribution module 210 utilizes playback statistics to estimate a first probability distribution of network speed and a second probability distribution of viewport size. In some implementations, a joint probability distribution of bandwidth and viewport size may be utilized. With respect to the joint probability distribution, the bandwidth may be independent of the viewport size. Furthermore, a product of the first and second probability distributions may be used as an approximation of the joint probability distribution. In one implementation, P [X, V] may be referred to as the joint probability distribution. The variable X may denote network speed at a client device and the variable V may denote viewport size of the client device.

The playback statistics may refer to client-measured bandwidth (also referred to herein as network speed) and client viewport size. In one implementation, the variable X may denote network speed at a client and the variable V may denote viewport size of the client. Probability distribution module 210 may access feedback data 291 at data store 106 to generate the first and second probability distributions. Feedback data 291 may include statistics garnered from Quality of Experience (QoE) pings received from media players at client systems. The QoE pings may include, for example, measurements of throughput (e.g., bandwidth and/or network speed) at the media player and the viewport size adopted at the media player. The QoE pings may be provided at least once per playback at a media player. The network speed data from feedback data 291 may be aggregated to estimate the first probability distribution for network speed X. Similarly, the viewport size data from feedback data 291 may be aggregated to estimate the second probability distribution for viewport size V. The first and second probability distributions, and/or the joint probability distribution of X and V (i.e., P [X, V]), may be stored as probability distribution data 292 in data store 106.

In some implementations, probability distributions may be estimated based on different granularities, such as geographic locations, genres, channels, content type, and so on. For example, feedback data 291 from media players in a specific geographic region may be analyzed to estimate the first and second probability distributions, thus providing a view of aggregated probabilities of network speed and viewport sizes for the particular geographic region.

Subsequent to, or in parallel with, the estimation of probability distributions for network speed and viewport size, the rate-quality model generation module 220 generates one or more rate-quality models for a video that is to be encoded. The video may be referred to herein as a source video, which may be stored in media item data 290 of data store 106. In some implementations, the source video is first partitioned into segments, where each segment contains several seconds of video. The rate-quality model generation module 220 may then process each video segment of the video.

The rate-quality model generation module 220 may encode a segment of the video into different bitrates at each supported resolution. For example, a segment can be encoded into different bitrates at 240p, 360p, 480p, 720p and 1080p, respectively. For purposes of discussion, the rate-quality model generation module 220 may, for each resolution, encode the source video into versions with M bitrates. The versions can be indexed using the variable n, where a larger m corresponds to a higher encoding bitrate. The encoding bitrate of the m'th version may be denoted as $b\_m$.

For each encoded version of the segment, the rate-quality model generation module 220 may measure a corresponding quality metric. A quality metric may be a measurement resulting from a video quality evaluation. Video quality evaluation may be performed to describe the quality of a set of video sequences under study. Video quality can be evaluated objectively (e.g., by mathematical models) or subjectively (e.g., by asking users for their rating). Also, the quality of a system can be determined offline (i.e., in a laboratory setting for developing new codecs or services), or in-service (to monitor and ensure a certain level of quality). Some models that are used for video quality assessment (including, but not limited to, peak signal-to-noise ratio (PSNR) or structural similarity (SSIM)) are image quality models whose output is calculated for every frame of a video sequence. This quality measure of every frame can then be recorded over time to assess the quality of an entire video sequence. For the purpose of discussion, for a given resolution, $q\_m$ may denote the measured quality of the encoded version with encoding bitrate $b\_m$.

In one example, the PSNR model may be used to measure the quality metric, where PSNR provides for the ratio between the maximum possible power of a signal and the power of corrupting noise that affects the fidelity of its representation. In another example, the SSIM model may be used to measure the quality metric. The SSIM model is an index that measures the similarity between two images where the measurement or prediction of image quality is based on an initial uncompressed or distortion-free image as reference. In other examples, a combination of the PSNR model and the SSIM model may be used to measure the quality metric. Any type of quality metric may be applied to measure the quality in implementations of the disclosure.

Using the resulting bitrate-quality measurements $(b\_1, q\_1), \ldots, (b\_M, q\_M)$, the rate-quality generation module 220 fits a rate-quality model $Q\_r\_i(x\_i)$, where $Q\_r\_i$ represents the quality measurement at the resolution of the i'th representation (i.e., $r\_i$) encoded at the $x\_i$ encoding bitrate. As such, each resolution/bitrate version of the segment has a corresponding quality measurement represented in the fitted rate-quality module. Or, in other words, each resolution of the segment has a quality measurement (represented in rate-quality model $Q\_i(x\_i)$) corresponding to a potential encoding bitrate for the representation. The rate-quality model of implementations of the disclosure may be obtained using processes different than the above-described process.

For example, the rate-quality model may be obtained by analyzing the content of the video and creating a rate-quality model from the resulting analysis. In one implementation, the generated rate-quality model for the source video may be stored in rate-quality model data 293 of data store 106.

The requesting probability determination module 230 utilizes the probability distributions (generated by probability distribution module 210) to predict the probability, for each representation i of the segment encoded at a particular bitrate, of being requested for streaming of the segment to a media player. This predicted probability may be represented as $P\_i$. There are two cases at which the media player may request the i'th resolution.

The first case is when the bandwidth X falls between $x\_i$ and $x\_i+1$ and viewport size is larger than $r\_i$ (the resolution at "i"). The probability for this case is $P[x\_i<=X<x\_i+1, V>=v\_i]$.

The second case is when the bandwidth is higher than $x\_i+1$ and $r\_i+1$ is larger than $r\_i$, but the viewport size is equal to $r\_i$. The probability for this case is thus $\mathbb{1}(r\_i+1>r\_i)P[X>=x\_i+1, V=v\_i]$. $\mathbb{1}(.)$ is an indicator function, where the function operates to equal one if a condition is satisfied, and otherwise it equals zero. In sum, $P\_i=P[x\_i<=X<x\_i+1, V>=v\_i]+\mathbb{1}(r\_i+1>r\_i)P[X>=x\_i+1, V=v\_i]$. $P\_i$ may be referred to herein as a requesting probability.

As discussed above, the probability distribution of X and V (e.g., joint probability distribution $P[X, V]$) that was previously estimated by the probability distribution module 210 and may be accessed as probability distribution data 292 in data store 106. In one implementation, if the probability distributions are estimated based on a particular granularity, such as geographic region, genre, and so on, then the predicted probability may represent the probability that the version of the segment is selected by client systems that are grouped into the particular granularity (e.g., client systems in the geographic region, client systems requesting that genre of video, etc.).

$P\_i$ (i.e., requesting probability) is a function of encoding bitrate $\{x\_i: 1<=i<=N\}$. Using the above equation, $P\_i$ can be estimated by the requesting probability determination module 230 given any arbitrary encoding bitrate setting $\{x\_i: 1<=i<=N\}$. In some implementations, the requesting probability determination module 230 predicts the requesting probability at any encoding bitrate vector $(x\_1, \ldots, x\_N)$ when these representations of the video segment are requested.

The encoding bitrate selection module 240 may utilize the requesting probabilities determined by requesting probability determination module 230, as well as the rate-quality model 293 generated by rate-quality model generation module 220, to determine an optimal set of encoding bitrates for the segment of the source video. The encoding bitrate selection module 240 may apply a non-linear optimization process to determine the optimized encoding bitrates for the different representation of the segment of the source video.

In one example, the average quality of a segment, such as the segment of the source video, delivered to client system can be estimated by: $Q\_avg=Q\_1*P\_1+Q\_2*P\_2+\ldots+Q\_N*P\_N$, where $Q\_i=Q\_r\_i(x\_i)$ is the quality of encoded version i. Similarly, the average video bitrate (egress traffic) from a server is $R\_avg=x\_1*P\_1+x\_2*P\_2+x\_N*P\_N$, where $x\_i$ is the encoding bitrate of version i. The encoding bitrate selection module 240 may implement a non-linear optimizer to minimize $R\_avg$, such that $Q\_avg$ is greater than or equal to a quality threshold, Q (also referred to herein quality threshold value). The quality threshold value may be configured by an administrator of the adaptive bitrate streaming system and stored in quality data 295 in data store 106.

In the above example, the quality threshold, Q, is the average quality the server aims to achieve. $P\_i$ is the encoding bitrate-resolution probability estimated by the requesting probability determination module 230. $Q\_i$ is given by the rate-quality model generated by rate-quality model generation module 220 and stored in rate-quality model data 293. To solve this optimization, the encoding bitrate selection module 240 may implement a generic non-linear programming solver (also referred to as a non-linear optimizer) to obtain the set of $x\_i$ values, which represent the optimal encoding bitrates at representation $i=1, \ldots, N$. The solution determined by the encoding bitrate selection module 240 provides the encoding bitrates that minimize the egress video traffic while allowing for the average video quality to be higher than quality threshold value Q.

In some implementations, the encoding bitrate selection module 240 may further solve the dual problem: Maximize $Q\_1*P\_1+Q\_2*P\_2+\ldots+Q\_N*P\_N$, such that $(x\_1*P\_1+x\_2*P\_2+\ldots+x\_N*P\_N)<=R$. In this above example, R is the constraint on average video egress traffic (also referred to herein an egress threshold value or egress constraint threshold value), which may be found in egress constraint data 296 of data store 106. The solution to this problem gives the encoding bitrates that maximizes the average video quality traffic while allowing the average video traffic egress to be no more than R.

Implementations of the disclosure are not limited to optimizing based on the above two examples. In further implementations, other optimizations may be solved. For example, the encoding bitrate selection module 240 may determine the optimized set of encoding bitrates that minimizes storage size while maintaining quality. In another example, the encoding bitrate selection module 240 may add temporal direction constraint(s), such as the quality difference between adjacent video segments being less than a threshold. In one example, the encoding bitrate selection module 240 may utilize other network metrics to select the optimized set of encoding bitrates, such as adding a constraint that the lowest representation should have bitrate less than (or, in some implementations, higher than) a threshold.

The optimized encoding bitrates determined by the encoding bitrate selection module 240 may be used to minimize egress traffic from the server to client systems, without compromising delivered quality of the video. The encoding bitrate optimization component 140 may apply to a single video as a whole and/or may apply to segments of the video. For example, the encoding bitrate optimization component 140 may partition the video into segments and apply the process described above to each segment to determine the optimal encoding bitrate selections adaptive to different contents of a video.

Figure 3:
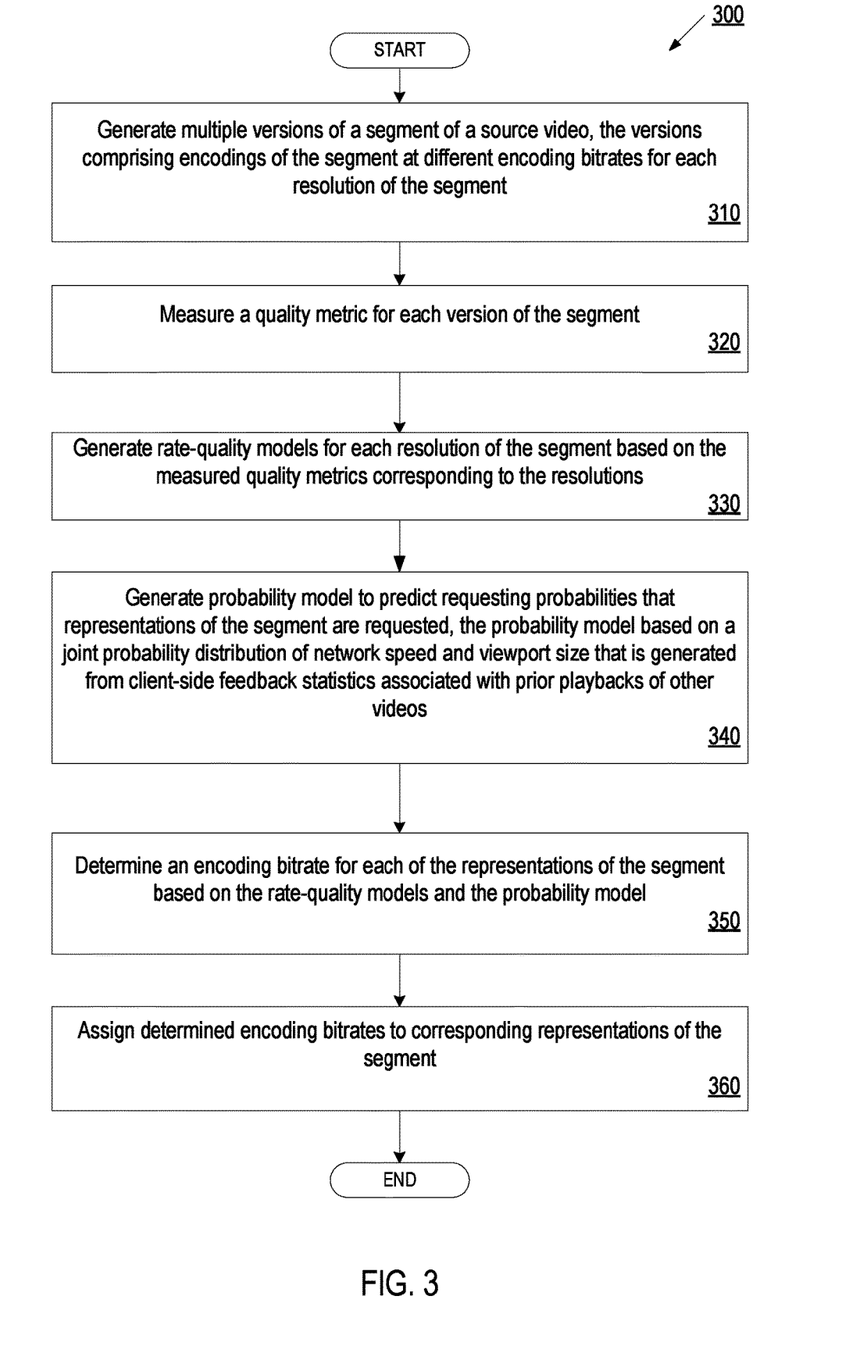
FIG. 3 is a flow diagram illustrating a method for bitrate optimization for multi-representation encoding using playback statistics according to an implementation.

FIG. 3 is a flow diagram illustrating a method 300 for bitrate optimization for multi-representation encoding using playback statistics according to some implementations of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art should understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by encoding bitrate optimization component 140 as shown in FIG. 2.

Method 300 begins at block 310 where multiple versions of a segment of a source video are generated. The versions may include encodings of the segment at different encoding bitrates for each resolutions associated with the segment. At block 320, a quality metric is measured for each version of the segment. The quality metric may be a PSNR measurement or a SSIM measurement, to name a few examples. In one implementation, the measured quality metrics are used to generate rate-quality models for each of the different resolutions.

Subsequently, at block 330, a probability model is generated to predict requesting probabilities that representations of the segment are requested. The probability model may be based on an empirical joint probability distribution of network speed and viewport size that is generated from client-side feedback statistics associated with prior playbacks of other videos. As discussed above, the representation of the segment may refer to one of multiple encoding bitrates selected for a single resolution (e.g., 2 bitrates selected for 240p: 240p_100 kbps and 240p_200 kbps).

At block 340, an encoding bitrate is determined for each of the representations of the segment. The encoding bitrate is determined for a representation based on the rate-quality models (determined at block 320) and the probability model (determined at block 330). In one implementation, a non-linear optimizer is used to determine the set of encoding bitrates the representations of the segment. Lastly, at block 350, determined encoding bitrates are assigned to corresponding representation of the representations of the segment. This bitrate/representation assignment may be used by an encoder as an encoding configuration for the video segment.

Figure 4:
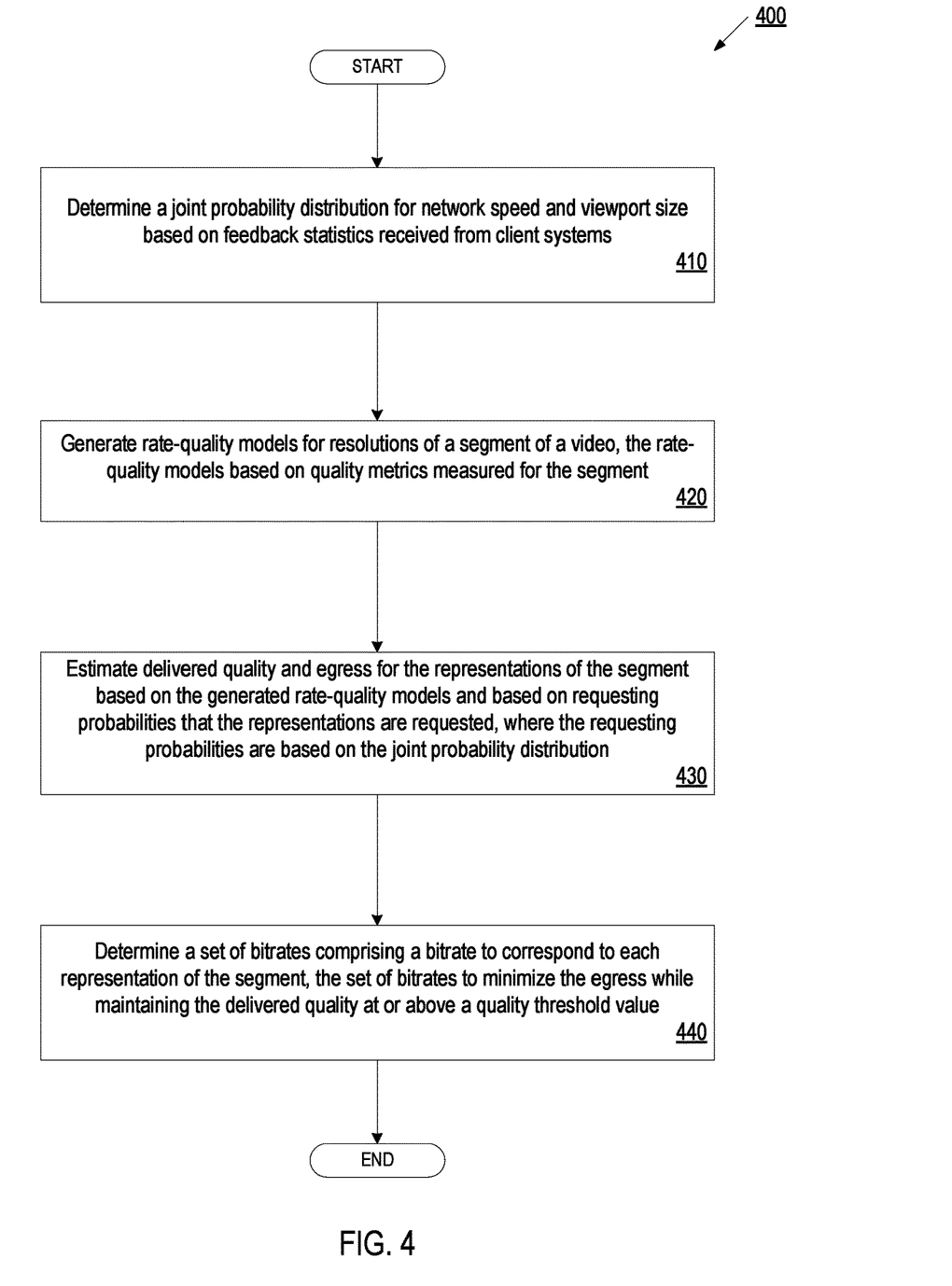
FIG. 4 is a flow diagram illustrating a method for multi-representation encoding bitrate optimization to minimize egress based on playback statistics according to an implementation.

FIG. 4 is a flow diagram illustrating a method 400 for multi-representation encoding bitrate optimization to minimize egress based on playback statistics, according to an implementation of the disclosure. The method 400 may be performed by processing logic that comprises hardware (e.g., circuitry, dedicated logic, programmable logic, microcode, etc.), software (e.g., instructions run on a processing device to perform hardware simulation), or a combination thereof. In one implementation, method 400 may be performed by encoding bitrate optimization component 140 as shown in FIG. 2.

Method 400 begins at block 410 where a joint probability distribution for network speed and viewport size is determined. The joint probability distributions may be based on feedback statistics received from client systems. In some implementations, the joint probability distribution may be estimated for geographic regions and/or other categories by utilizing feedback statistics corresponding to those categories (e.g., feedback statistics gathered from media players located in the geographic region, etc.).

At block 420, rate-quality models for resolutions of a segment of a video are generated based on quality metrics measured for the segment.

Subsequently, at block 430, a delivered quality and egress are estimated for the encodings based on the generated rate-quality models and based on requesting probabilities that the representations are requested. The requesting probabilities may be based on the joint probability distribution. In one implementation, the delivered quality is a weighted sum of a quality of the encodings, where the weight is the probability that the encoding is requested. The egress may be the weighted sum of the bitrates, where the weight is the probability that the encoding is requested. An arbitrary bitrate for each representation may be selected to generate the estimated delivered quality and egress, resulting in different possible delivered quality and egress results.

Lastly, at block 440, a set of bitrates are determined that minimize the egress (at block 430) while maintaining the delivered quality (at block 430) at or above a quality threshold value. The set of bitrates includes a bitrate that corresponds to each representation of the segment. In one implementation, a non-linear optimizer is used to determine that set of bitrates for the corresponding representations that minimizes the determined egress while maintaining the determined quality.

Figure 5:
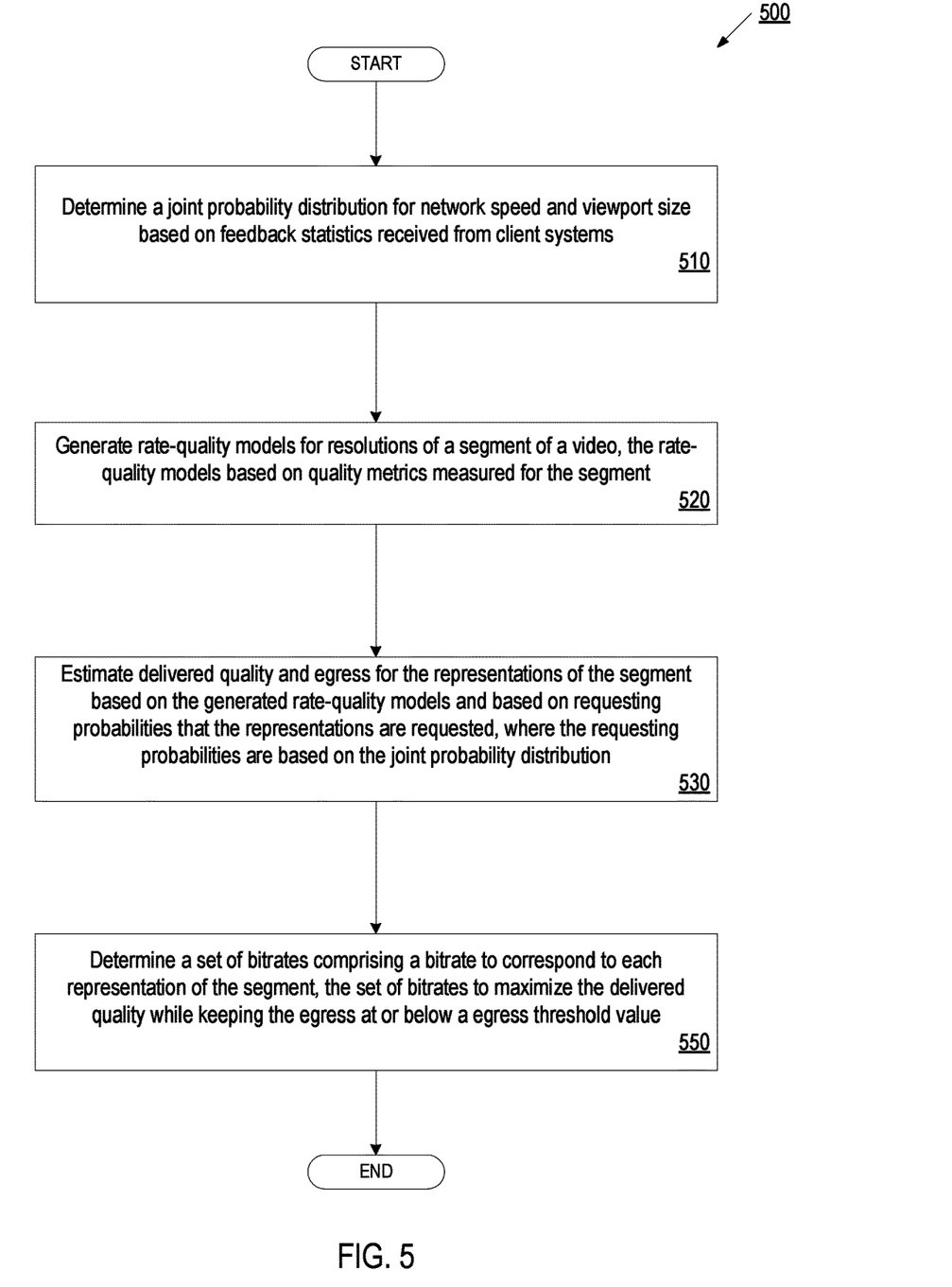
FIG. 5 is a flow diagram illustrating a method for multi-representation encoding bitrate optimization to maximize quality based on playback statistics, according to an implementation.

FIG. 5 is a flow diagram illustrating a method 500 for multi-representation encoding bitrate optimization to maximize quality based on playback statistics, according to an implementation of the disclosure. The method 500 may be performed by processing logic that comprises hardware (e.g., circuitry, dedicated logic, programmable logic, microcode, etc.), software (e.g., instructions run on a processing device to perform hardware simulation), or a combination thereof. In one implementation, method 500 may be performed by encoding bitrate optimization component 140 as shown in FIG. 2.

Blocks 510 through 530 of method 500 are similar to blocks 410 through 430 of method 400. The description provided above for block 410 through 430 may similarly apply to blocks 510 through 530 of method 500. At block 540 of method 500, a set of bitrates are determined that maximize the delivered quality (at block 530) while keeping the determined egress (at block 530) at or below an egress threshold value. The set of bitrates includes a bitrate that corresponds to each representation of the segment. In one implementation, a non-linear optimizer is used to determine that set of bitrates for the corresponding representations that maximizes the delivered quality while keeping the determined egress at or below the egress threshold value.

Figure 6:
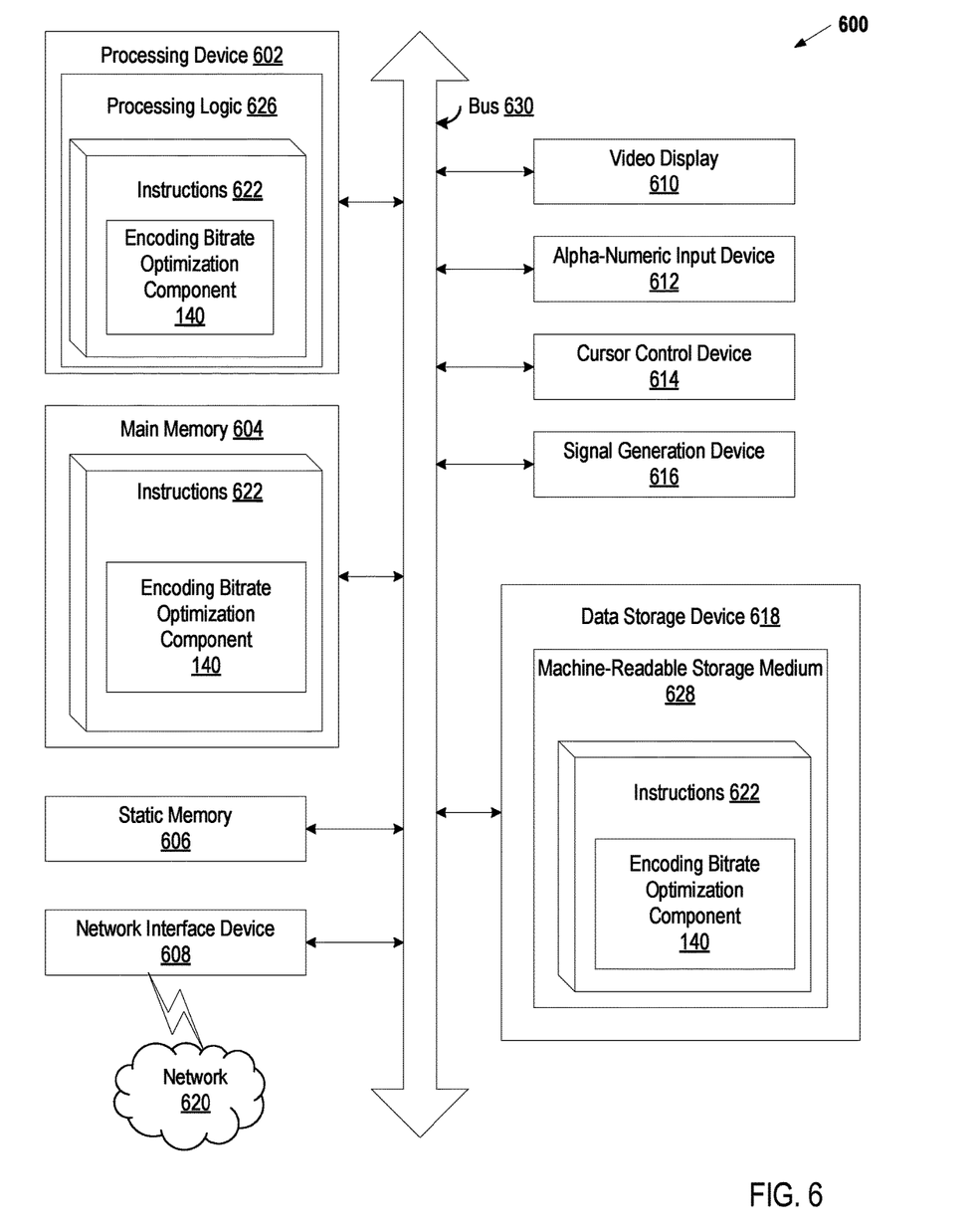
FIG. 6 is a block diagram illustrating one implementation of a computer system, according to an implementation.

FIG. 6 illustrates a diagrammatic representation of a machine in the exemplary form of a computer system 600 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 600 may be representative of a server, such as server 102, executing an encoding bitrate optimization component 140, as described with respect to FIGS. 1 and 2.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 602 is configured to execute processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable storage medium 628 (also referred to as a machine-readable storage medium), on which is stored one or more set of instructions 622 (e.g., software) embodying any one or more of the methodologies of functions described herein. The instructions 622 may also reside, completely or at least partially, within the main memory 604 and/or within the processing device 602 during execution thereof by the computer system 600; the main memory 604 and the processing device 602 also constituting machine-readable storage media. The instructions 622 may further be transmitted or received over a network 620 via the network interface device 608.

The computer-readable storage medium 628 may also be used to store instructions to perform a method for bitrate optimization for multi-representation encoding using playback statistics, as described herein. While the computer-readable storage medium 628 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several implementations of the disclosure. It should be apparent to one skilled in the art, however, that at least some implementations of the disclosure may be practiced without these specific details. In other instances, well-known components or methods are not described in detail or are presented in simple block diagram format in order to avoid unnecessarily obscuring the disclosure. Thus, the specific details set forth are merely exemplary. Particular implementations may vary from these exemplary details and still be contemplated to be within the scope of the disclosure.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

What is claimed is:
1. A method comprising:
generating multiple versions of a segment of a source video, the versions comprising encodings of the segment at different encoding bitrates for each resolution of the segment;
measuring a quality metric for each version of the segment;
generating rate-quality models for each resolution of the segment based on the measured quality metrics corresponding to the resolutions;
obtaining client-side feedback statistics associated with prior playbacks of other videos different from the source video, wherein the client-side feedback statistics comprise playback traces transmitted from media players at client devices in a same geographic region of the source video, the playback traces comprising a respective network speed and a respective viewport size utilized on a respective client device for each of the prior playbacks;
generating, by a processing device, a probability model specific to the geographic region to predict requesting probabilities that representations of the segment are requested, the probability model based on a joint probability distribution of network speed and viewport size that is generated from the client-side feedback statistics associated with the prior playbacks of the other videos;

determining, by the processing device, an encoding bitrate for each of the representations of the segment based on the rate-quality models and the probability model; and assigning determined encoding bitrates to corresponding representations of the segment.

2. The method of claim 1, wherein the segment comprises the entire source video.

3. The method of claim 1, wherein the requesting probability for one of the representations is further based on:

the encoding bitrate of the representation and a relation of the encoding bitrate to network speed in the joint probability distribution; and the resolution of the representation and a relation of the resolution to viewport size in the joint probability distribution.

4. The method of claim 1, wherein the joint probability distribution is generated from cumulative measurements of the network speeds determined from the playback traces and from cumulative measurements of the viewport sizes determined from the playback traces.

5. The method of claim 4, wherein the playback traces are collected for a type of the source video, and wherein the joint probability distribution is specific to the type of the source video.

6. The method of claim 1, wherein determining the encoding bitrate for each of the representations further comprises minimizing an average egress traffic for the segment such that an average quality of the segment is maintained at or above a defined quality level, wherein the average egress traffic is a function of the different encoding bitrates and the requesting probabilities, and wherein the average quality is a function of the quality metrics and the requesting probabilities.

7. The method of claim 1, wherein determining the encoding bitrate for each of the representations further comprises maximizing an average quality for the segment such that an average egress traffic of the segment is maintained at or below a defined video egress traffic level, wherein the average quality is a function of the quality metrics and the requesting probabilities, and wherein the average egress traffic is a function of the multiple bitrates and the requesting probabilities.

8. The method of claim 1, wherein assigning the determined encoding bitrates to the corresponding representations further comprises providing the selected encoding bitrates to at least one transcoder for encoding of each of the representations of the segment at the corresponding bitrate.

9. The method of claim 1, wherein the representation comprises a bitrate/resolution combination of the segment, and wherein the segment comprises one or more representations for each of the resolutions of the segment.

10. The method of claim 1, wherein the quality metric comprises at least one of a Peak Signal-to-Noise Ratio (PSNR) measurement or a Structural Similarity (SSIM) measurement.

11. A system comprising:

a memory; and a processing device coupled to the memory, wherein the processing device is to:

obtain client-side feedback statistics associated with prior playbacks of multiple videos different from a source video, wherein the client-side feedback statistics comprise playback traces transmitted from media players at client devices in a same geographic region of the source video, the playback traces comprising a respective network speed and a respective viewport size utilized on a respective client device for each of the prior playbacks;

determine a joint probability distribution for network speed and viewport size based on the client-side feedback statistics received from client systems, the joint probability distribution specific to the geographic region;

generate rate-quality models for resolutions of a segment of the source video based on quality metrics measured for the segment;

estimate a delivered quality and egress for representations of the segment based on the generated rate-quality models and based on requesting probabilities that the representations are requested, wherein the requesting probabilities are based on the joint probability distribution; and determine a set of bitrates comprising a bitrate to correspond to each of the representations of the segment, the set of bitrates determined to minimize the egress while maintaining the delivered quality at or above a quality threshold value.

12. The system of claim 11, wherein the requesting probability that one of the representations is requested is further based on:

the bitrate of the representation and a relation of the bitrate to network speed in the joint probability distribution; and the resolution of the representation and a relation of the resolution to viewport size in the joint probability distribution.

13. The system of claim 11, wherein the joint probability distribution is generated from cumulative measurements of the network speeds determined from the playback traces and from cumulative measurements of the viewport sizes determined from the playback traces.

14. The system of claim 13, wherein the playback traces are collected for a type of the source video, and wherein the joint probability distribution is specific to the type of the source video.

15. The system of claim 11, wherein the processing device is further to provide the determined set of bitrates to at least one transcoder for encoding of each of the representations of the segment at the corresponding bitrate.

16. The system of claim 11, wherein the delivered quality is based on at least one of Peak Signal-to-Noise Ratio (PSNR) measurements of the encodings or Structural Similarity (SSIM) measurements of the encodings.

17. A non-transitory machine-readable storage medium storing instructions which, when executed, cause a processing device to perform operations comprising:

obtaining client-side feedback statistics associated with prior playbacks of multiple videos different from a source video, wherein the client-side feedback statistics comprise playback traces transmitted from media players at client devices in a same geographic region of the source video, the playback traces comprising a respective network speed and a respective viewport size utilized on a respective client device for each of the prior playbacks;

determining a joint probability distribution for network speed and viewport size based on the client-side feedback statistics received from client systems, the joint probability distribution specific to the geographic region;

generating rate-quality models for resolutions of a segment of a video based on quality metrics measure for the segment;

estimating, by the processing device, a delivered quality and egress for representations of the segment based on the generated rate-quality models and based on requesting probabilities that the representations is requested, wherein the requesting probabilities are based on the joint probability distribution; and determining, by the processing device, a set of bitrates comprising a bitrate to correspond to each of the representations of the segment, the set of bitrates determined to maximize the delivered quality while keeping the egress at or below an egress threshold value.

18. The non-transitory machine-readable storage medium of claim 17, wherein the requesting probability that one of the representations is requested is further based on:

the bitrate of the representation and a relation of the bitrate to network speed in the joint probability distribution; and the resolution of the representation and a relation of the resolution to viewport size in the joint probability distribution.

19. The non-transitory machine-readable storage medium of claim 17, wherein the joint probability distribution is generated from cumulative measurements of the network speeds determined from the playback traces and from cumulative measurements of the viewport sizes determined from the playback traces.

20. The non-transitory machine-readable storage medium of claim 19, wherein the playback traces are collected for a type of the source video, and wherein the joint probability distribution is specific to the type of source video.

21. The non-transitory machine-readable storage medium of claim 17, wherein the processing device is further to provide the determined set of bitrates to at least one transcoder for encoding of each of the representations of the segment at the corresponding bitrate.

22. The non-transitory machine-readable storage medium of claim 17, wherein the delivered quality is based on at least one of Peak Signal-to-Noise Ratio (PSNR) measurements of the segment or Structural Similarity (SSIM) measurements of the segment.

\* \* \* \* \*